US009503607B2

(12) United States Patent
Nakase

(10) Patent No.: US 9,503,607 B2
(45) Date of Patent: Nov. 22, 2016

(54) IMAGE CAPTURE APPARATUS AND METHOD OF CONTROLLING THE SAME

(71) Applicant: CANON KABUSHIKI KAISHA, Tokyo (JP)

(72) Inventor: Yuichi Nakase, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/982,255

(22) Filed: Dec. 29, 2015

(65) Prior Publication Data

US 2016/0112599 A1 Apr. 21, 2016

Related U.S. Application Data

(63) Continuation of application No. 13/948,504, filed on Jul. 23, 2013, now Pat. No. 9,237,302.

(30) Foreign Application Priority Data

Jul. 25, 2012 (JP) ................................ 2012-165140

(51) Int. Cl.
*H04N 5/77* (2006.01)
*H04N 1/21* (2006.01)
*H04N 5/91* (2006.01)
*H04N 9/804* (2006.01)
*H04N 9/82* (2006.01)

(52) U.S. Cl.
CPC ............ *H04N 1/2129* (2013.01); *H04N 5/772* (2013.01); *H04N 5/91* (2013.01); *H04N 9/8042* (2013.01); *H04N 9/8211* (2013.01)

(58) Field of Classification Search
CPC ............ H04N 1/2129; H04N 9/8042; H04N 9/8211; H04N 5/772; H04N 5/91

USPC .......... 348/207.1, 231.1, 231.2, 231.3, 231.5
See application file for complete search history.

(56) References Cited

U.S. PATENT DOCUMENTS

| 9,237,302 B2 | 1/2016 | Nakase |
| 2010/0200740 A1* | 8/2010 | Ino ........................ B29C 43/021 250/251 |
| 2011/0103696 A1* | 5/2011 | Mizuno .............. H04N 1/00159 382/190 |
| 2012/0200717 A1* | 8/2012 | Suzuki ............... H04N 1/32106 348/207.1 |
| 2012/0200740 A1 | 8/2012 | Gum et al. |

FOREIGN PATENT DOCUMENTS

| JP | 2005-260393 A | 9/2005 |
| JP | 2009-027647 A | 2/2009 |

*Primary Examiner* — Twyler Haskins
*Assistant Examiner* — Padma Haliyur
(74) *Attorney, Agent, or Firm* — Carter, DeLuca, Farrell & Schmidt, LLP

(57) ABSTRACT

The size of an image file is not influenced even if location information is added or deleted after storing the image file. To achieve this, when an image is stored on a storage medium, whether GPS measurement was successful is determined. If measurement was successful, information indicating the existence of location information is stored in a first area as attribute information compliant with the image file format, the acquired location information is stored in a second area as attribute information, and the image is stored in a predetermined format. If not, information indicating the existence of location information is stored in the first area, predetermined information is stored in the second area, a reserved area having a pre-set size is allocated in a continuous area that follows the second area, and the captured image is stored.

11 Claims, 6 Drawing Sheets

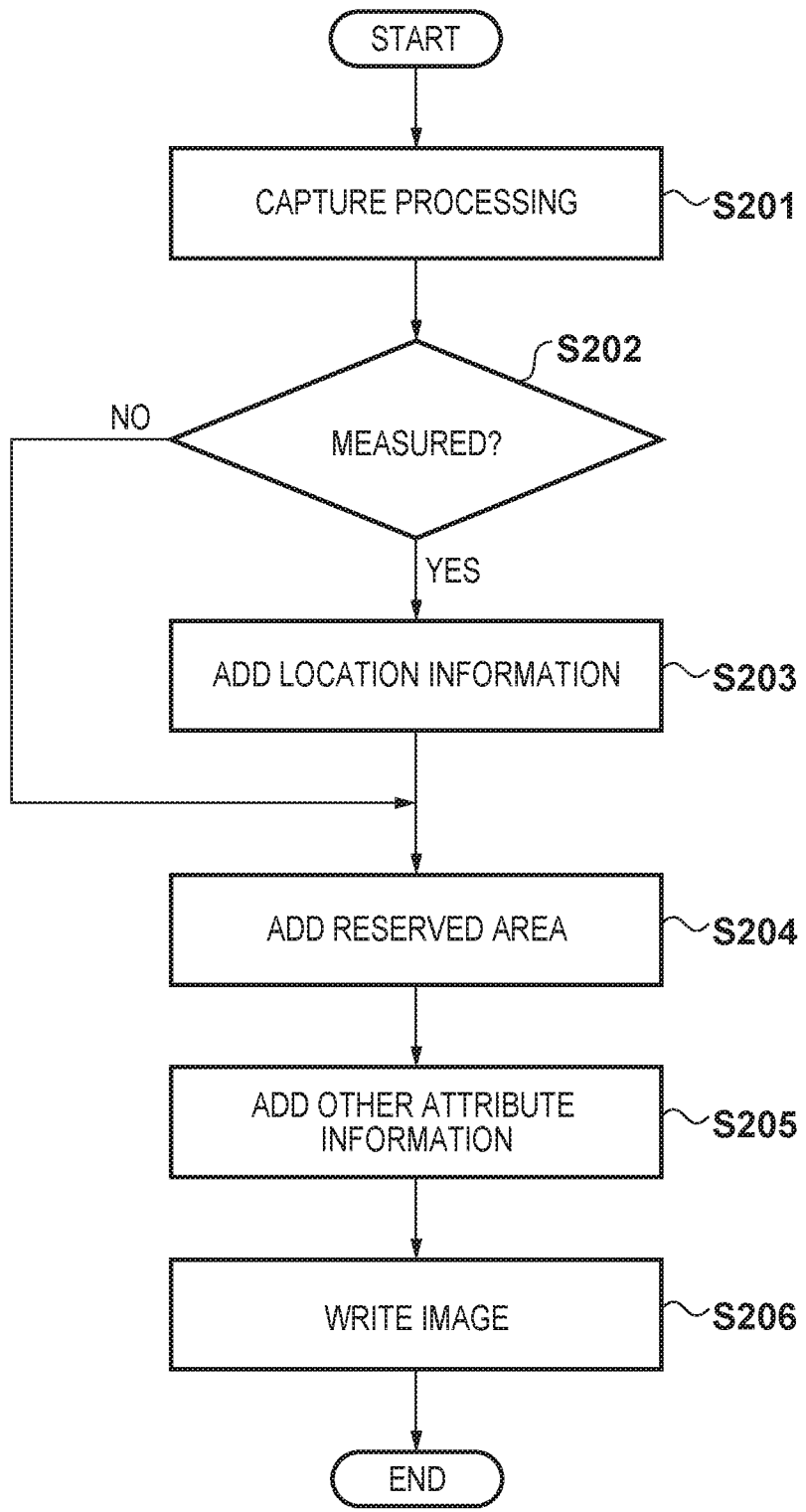

IMAGE CAPTURE APPARATUS AND METHOD OF CONTROLLING THE SAME

CROSS REFERENCE TO RELATED APPLICATIONS

This application is a continuation of U.S. patent application Ser. No. 13/948,504 filed on Jul. 23, 2013, which claims the benefit of and priority to Japanese Patent Application No. 2012-165140, filed Jul. 25, 2012, each of which are hereby incorporated by reference herein in their entirety.

BACKGROUND OF THE INVENTION

Field of the Invention

The present invention relates to technology for the addition and deletion of attribute information regarding captured images in an apparatus that has an image capturing function.

Description of the Related Art

Conventionally, an image processing apparatus has been proposed in which location information is added to an image after the image is captured (e.g., see Japanese Patent Laid-Open No. 2009-027647, which is referred to hereinafter as Document 1).

According to Document 1, an image capture apparatus records a captured image as an image file, and a mobile information terminal that can communicate with the image capture apparatus acquires location information using GPS. The image capture apparatus then receives that location information from the mobile information terminal, and adds the location information to the already-recorded image file as part of its attribute information.

In general, location information as defined by EXIF, which represents image attribute information, exists in the header portion of an image file, and the insertion of location information there increases the size of the header portion, thus requiring subsequent image data to be moved by that amount of increase. Also, even assuming that an area for writing location information has been allocated in advance, since indeterminate values are not defined in location information as defined by EXIF, the allocated data will necessarily be treated as data indicating location information for somewhere in the world.

SUMMARY OF THE INVENTION

The present invention has been achieved in view of the above-described problems. The present invention provides technology according to which the size of an image file is not influenced even if location information is added or deleted after the storage of the image file, and such addition and deletion is realized by partial rewriting.

According to an aspect of this disclosure, there is provided an image capture apparatus that stores an image captured by an image capture unit to a recording medium as an image file having a predetermined image file format, the image capture apparatus comprising: an acquisition unit that acquires location information; a determination unit that determines whether or not acquisition of location information by the acquisition unit was successful; and a storage control unit that, in a case of storing an image captured by the image capture unit to the recording medium as an image file that complies with the image file format, if a result of the determination performed by the determination unit is that acquisition of location information was successful, stores information indicating the existence of location information in a first area as attribute information that complies with the image file format, stores the acquired location information in a second area as attribute information, and stores the captured image in a predetermined format, and if a result of the determination performed by the determination unit is that acquisition of location information was unsuccessful, stores information indicating the existence of location information in the first area that complies with the image file format, stores predetermined information other than location information in the second area, allocates a reserved area for location information recording in a continuous area that follows the predetermined information, and stores the captured image in a predetermined format.

According to the present invention, the size of an image file is not influenced even if location information is added or deleted after the storage of the image file, and such addition and deletion is realized by partial rewriting.

Further features of the present invention will become apparent from the following description of exemplary embodiments with reference to the attached drawings.

BRIEF DESCRIPTION OF THE DRAWINGS

FIG. 2 is a flowchart showing a capture mode of the digital camera according to the embodiment.

DESCRIPTION OF THE EMBODIMENTS

Hereinafter, an embodiment of the present invention will be described in detail with reference to the accompanying drawings.

Although an image capture apparatus is described taking the example of a digital camera in the present embodiment, the image capture apparatus can be any image processing apparatus that has an image capturing function, such as a mobile phone. Also, the image capture apparatus of the present embodiment is described as being able to record moving images and still images in accordance with a user selection. Furthermore, the image capture apparatus of the present embodiment has a location detection unit that employs GPS or the like, and is configured so as to be able to record acquired location information in files. The following describes the image capture apparatus of the present embodiment. The location detection unit is not limited to employing a method of acquiring location information using GPS. For example, the location detection unit may calculate location information using field intensity and location information acquired from mobile phone base stations, wireless LAN access points, and the like. Furthermore, the location detection unit may have multiple location detection systems and acquire location information using a combination of the systems in accordance with a predetermined standard.

The relevant configuration of an image capture apparatus 100 of the present embodiment will be described below with reference to FIG. 1.

Figure 1:
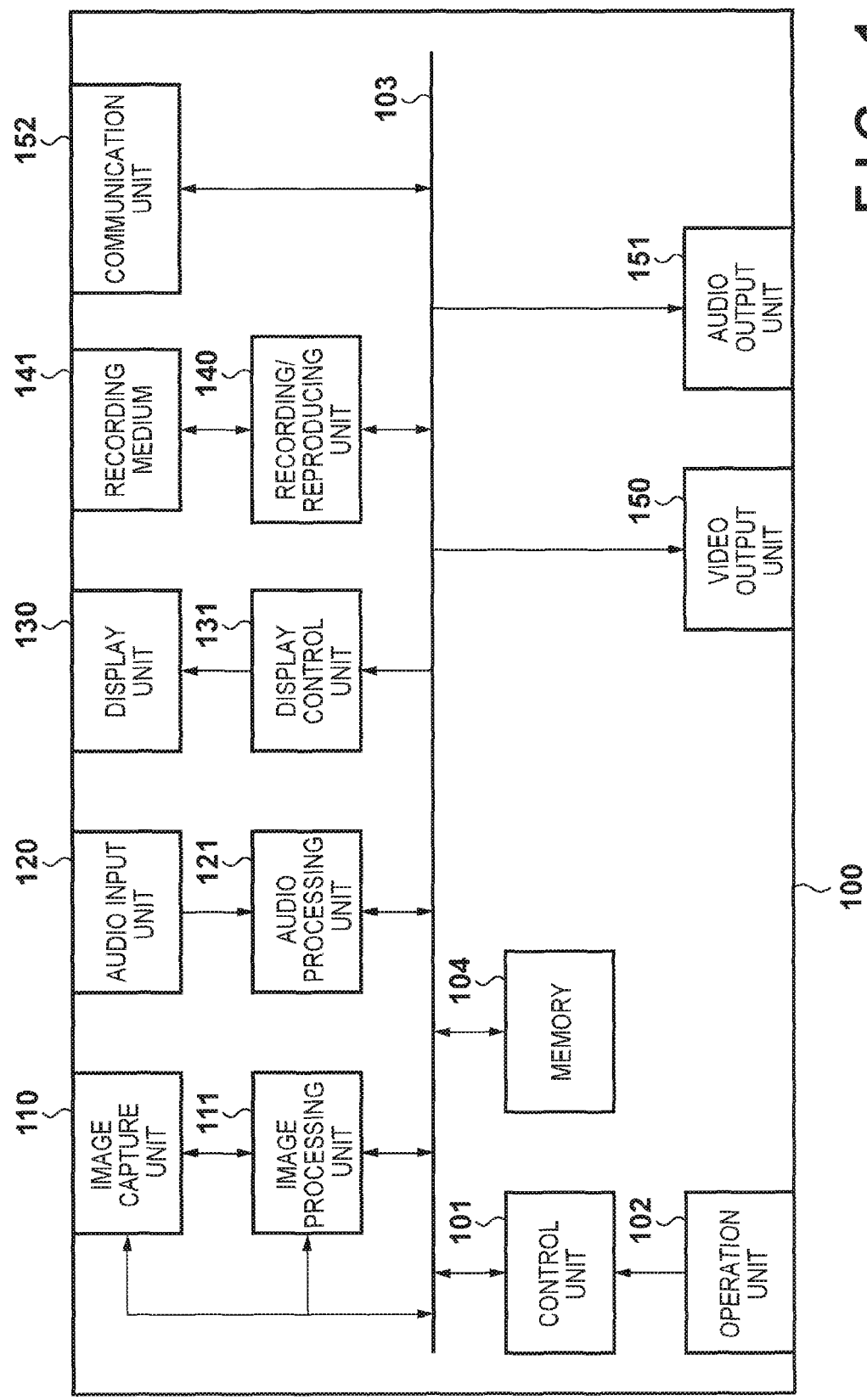
FIG. 1 is a block diagram showing a configuration of a digital camera according to an embodiment.

In FIG. 1, a control unit 101, which is configured by a CPU (MPU), a memory (DRAM, SRAM), and the like, controls blocks of the digital camera 100 and controls data transfers between blocks by executing various types of processes (programs). The control unit 101 also controls blocks of the image capture apparatus 100 in accordance with operation signals from an operation unit 102 that receives user operations. Furthermore, the control unit 101 analyzes images obtained by a later-described image processing unit 111, and controls blocks of the image capture apparatus 100 in accordance with the analysis results.

The operation unit 102 is configured by various switches for inputting various operations related to capture, such as a power button, a still image recording button, a moving image recording start button, a zoom adjustment button, and an autofocus button. The operation unit 102 also has a menu display button, an enter button, cursor keys, a pointing device, a touch panel, and the like, and transmits operation signals to the control unit 101 when the keys and buttons are operated by a user.

Also, a bus 103 is a general-purpose bus for sending various types of data, control signals, instruction signals, and the like to blocks of the image capture apparatus 100.

An image capture unit 110 uses an image capturing device such as a CCD sensor or a CMOS sensor to convert an optical image of a subject picked up by a lens into an image signal while controlling the amount of light using a diaphragm, subjects the image signal to analog/digital conversion, and transmits the resulting signal to the image processing unit 111.

The image processing unit 111 subjects an input digital image signal to image quality adjustment processing for adjusting the white balance, color, brightness, and the like based on setting values. The image signal subjected to processing by the image processing unit 111 is then transmitted by the control unit 101 to a memory 104, a later-described video output unit 150, and a display control unit 131.

In the present embodiment, the image capture unit 110 has an "optical zoom" function and an "optical antivibration" function, for example, and the image processing unit 111 has an "electronic zoom" function and an "electronic antivibration" function, for example. The "optical zoom" function and the "electronic zoom" function referred to here are functions for enlarging an obtained image in accordance with a user operation. The "optical antivibration" function and the "electronic antivibration" function are functions for preventing image shake due to vibration of the body of the image capture apparatus 100. Under control of the control unit 101, these functions are used simultaneously, used alternatingly, or used on their own.

The "optical zoom" function referred to here is a function for enlarging/reducing an optical image of a subject to be picked up, by moving the lens of the image capture unit 110 in accordance with an operation performed by the user on a zoom key of the operation unit 102. The "electronic zoom" function refers to processing in which, in accordance with an operation performed by the user on the zoom key of the operation unit 102, the image processing unit 111 cuts out part of the image generated by the image capture unit 110, enlarges the cut-out image, and generates an image signal for the enlarged image. The "optical antivibration" function is a function for preventing shake in an image to be acquired, by calculating a lens movement amount based on the value of an acceleration signal from a vibration detection unit (not shown) and moving the lens. The "electronic antivibration" function is a function for preventing image shake by adjusting the position of an image signal acquired by the image capture unit 110, based on the value of the acceleration signal from the vibration detection unit (not shown). The "electronic antivibration" function can also be realized by shifting the readout position in the image capturing device of the image capture unit 110 based on the value of the acceleration signal from the vibration detection unit (not shown). These functions will not be described in detail due to being known technology.

An audio input unit 120 collects sound (picks up sound) around the image capture apparatus 100 using an internally provided omnidirectional microphone, an external microphone connected thereto via an audio input terminal, or the like, subjects the collected sound to analog/digital conversion, and transmits the resulting signal to an audio processing unit 121. The audio processing unit 121 performs audio-related processing such as processing for optimizing the level of an input digital audio signal. The audio signal subjected to processing by the audio processing unit 121 is then transmitted by the control unit 101 to the memory 104. The memory 104 temporarily stores image signals and audio signals obtained by the image processing unit 111 and the audio processing unit 121.

The image processing unit 111 and the audio processing unit 121 read out an image signal and an audio signal that are temporarily stored in the memory 104, and generate a compressed image signal and a compressed audio signal or the like by performing image signal encoding and audio signal encoding or the like. The control unit 101 transmits the compressed image signal and the compressed audio signal to a recording/reproducing unit 140.

The recording/reproducing unit 140 records the compressed image signal and the compressed audio signal generated by the image processing unit 111 and the audio processing unit 121, other capture-related control data, and the like to a recording medium 141. If the audio signal is not to be subjected to compression encoding, the control unit 101 transmits the audio signal generated by the audio processing unit 121 and the compressed image signal generated by the image processing unit 111 to the recording/reproducing unit 140, and causes the recording/reproducing unit 140 to record them to the recording medium 141. Here, the recording medium 141 may be a recording medium built into the image capture apparatus or a removable recording medium, and needs only be able to record compressed image signals, compressed audio signals, audio signals, various types of data, and the like that are generated by the image capture apparatus 100. Examples of the recording medium 141 include various types of recording media, such as a hard disk, an optical disk, a magneto-optical disc, a CD-R, a DVD-R, a magnetic tape, a nonvolatile semiconductor memory, and a flash memory.

The recording/reproducing unit 140 reads out (reproduces) compressed image signals, compressed audio signals, audio signals, various types of data, and programs that are recorded on the recording medium 141. A compressed image signal and a compressed audio signal that were read out are then transmitted by the control unit 101 to the image processing unit 111 and the audio processing unit 121. The image processing unit 111 and the audio processing unit 121 temporarily store the compressed image signal and the compressed audio signal in the memory 104 and decode them according to a predetermined procedure, whereafter the audio processing unit 121 transmits the decoded audio signal to the audio output unit 151, and the image processing unit 111 transmits the decoded image signal to the video output unit 150 and the display control unit 131. If an audio signal is recorded in an uncompressed format on the recording medium 141, the control unit 101 transmits the audio signal directly to the audio output unit 151.

The audio output unit 151 is configured by an audio output terminal, for example, and transmits an audio signal in order to allow audio to be output from headphones, speakers, or the like that are connected to the terminal. Also, the audio output unit 151 may be a speaker that is built into the image capture apparatus 100 and outputs audio pertaining to the audio signal. The video output unit 150 is configured by a video output terminal, for example, and transmits an image signal in order to allow video to be displayed by an external display or the like that is connected to the terminal. The audio output unit 151 and the video output unit 150 may be one integrated terminal, such as an HDMI (High-Definition Multimedia Interface) (registered trademark) terminal.

The display control unit 131 causes a display unit 130 to display video based on an image signal transmitted from the image processing unit 111, operation screens (menu screens) for operating the image capture apparatus 100, and the like. The display unit 130 may be any display device, such as a liquid crystal display, an organic EL display, or electronic paper.

A communication unit 152 is for performing communication between the image capture apparatus 100 and an external apparatus, and transmits and receives data such as audio signals, image signals, compressed audio signals, and compressed image signals. The communication unit 152 also transmits and receives capture-related control signals such as capture start and end commands, as well as other information. The communication unit 152 also has a function for receiving a GPS satellite signal and determining its own location information (GPS signal reception module function). The communication unit 152 may further have a wireless communication module such as an infrared communication module, a Bluetooth (registered trademark) communication module, a wireless LAN communication module, a WirelessUSB communication module, and a GPS signal reception module.

The following describes normal operations of the image capture apparatus 100 of the present embodiment.

When the user operates the power button of the operation unit 102 of the image capture apparatus 100 according to the present embodiment, a startup instruction is sent from the operation unit 102 to the control unit 101. Upon receiving this instruction, the control unit 101 controls a power supply unit (not shown) so as to supply power to blocks of the image capture apparatus 100.

When power is supplied, the control unit 101 checks, based on an instruction signal from the operation unit 102, the mode of a mode switching switch of the operation unit 102, examples of the mode including a still image capture mode, a moving image capture mode, and a reproduction mode.

In the still image capture mode, if the user operates the still image recording button of the operation unit 102 when the image capture apparatus 100 is in the capture standby state, the image capture apparatus 100 performs image capturing, and a compressed image signal is recorded to the recording medium 141. The image capture apparatus 100 then returns to the capture standby state. In the moving image capture mode, if the user operates the moving image recording start button of the operation unit 102 when the image capture apparatus 100 is in the capture standby state, the image capture apparatus 100 starts image capturing, and a compressed image signal and either a compressed audio signal or an audio signal are recorded to the recording medium 141. When the user operates a moving image recording stop button of the operation unit 102, the image capture apparatus 100 ends image capturing and returns to the capture standby state. In the reproduction mode, a compressed image signal and either a compressed audio signal or an audio signal related to a file selected by the user are reproduced from the recording medium 141, an audio signal is output from the audio output unit 151, and video is displayed by the display unit 130. The user can also enter a menu screen for changing image capture apparatus settings by operating the operation unit 102, and can perform an item selection operation and a setting value change operation with respect to a selected item. Examples of such settings include date information, date/time information, time difference information, an area setting, user information, the capture mode, and the image format, which are held by the image capture apparatus 100.

First, the still image capture mode will be described. If the still image capture mode is set by the operation unit 102, first, the control unit 101 sets blocks of the image capture apparatus 100 to the capture standby state, as described above.

In the capture standby state, the image processing unit 111 transmits an image signal to the display control unit 131 and displays video related to the image signal on the display unit 130. The user prepares for capture while viewing the screen displayed in this way.

In the capture standby state, when a capture instruction signal is transmitted due to the user operating the still image recording button of the operation unit 102, the control unit 101 transmits a capture control signal to blocks of the image capture apparatus 100, and performs control such that the blocks perform operations such as those described hereinafter.

The image capture unit 110 uses an image capturing device to convert an optical image of a subject picked up by a lens into an image signal, subjects the image signal to analog/digital conversion, and transmits the resulting signal to the image processing unit 111. The image processing unit 111 analyzes subject information in the input digital image signal and performs image quality adjustment processing (white balance, color, brightness, and the like) based on setting values and the subject information. Examples of the subject information include a subject brightness distribution, a facial distribution, personal authentication information obtained as a result of recognizing faces, and a distance distribution. The image signal that was subjected to processing by the image processing unit 111 is then transmitted by the control unit 101 to the memory 104, the video output unit 150, and the display control unit 131. The user can then check the captured still image by viewing the video displayed on the display unit 130.

The image processing unit 111 then reads out the image signal temporarily stored in the memory 104, subjects it to predetermined encoding so as to generate a compressed image signal, and outputs the compressed image signal to the recording/reproducing unit 140. Based on file system management such as UDF or FAT, the recording/reproducing unit 140 writes the compressed image signal to the recording medium 141 as a still image file along with attribute information. Examples of attribute information include the aforementioned subject information, image capture apparatus settings, and external information acquired from the communication unit 152 (location information, a MAC address, and the like).

Note that when the encoding operation performed by the image processing unit 111 ends, the control unit 101 transmits a control signal for causing a transition to the capture standby state to blocks of the image capture apparatus 100, and returns to the capture standby state.

Next, the moving image capture mode will be described. If the moving image capture mode is set by the operation unit 102, first, the control unit 101 sets blocks of the image capture apparatus 100 to the capture standby state, as described above.

In the capture standby state, the image processing unit 111 transmits an image signal to the display control unit 131 and displays video related to the image signal on the display unit 130. The user prepares for capture while viewing the screen displayed in this way.

In the capture standby state, when a capture start instruction signal is transmitted due to the user operating the moving image recording start button of the operation unit 102, the control unit 101 transmits a capture start control signal to blocks of the image capture apparatus 100, and performs control such that the blocks perform operations such as those described hereinafter.

The image capture unit 110 uses an image capturing device to convert an optical image of a subject picked up by a lens into an image signal, subjects the image signal to analog/digital conversion, and transmits the resulting signal to the image processing unit 111. The image processing unit 111 performs image quality adjustment processing (white balance, color, brightness, etc.) on the input digital image signal based on setting values. The image signal that was subjected to processing by the image processing unit 111 is then transmitted by the control unit 101 to the display control unit 131 and the memory 104. The display control unit 131 displays video related to the received image signal on the display unit 130.

Meanwhile, the audio input unit 120 converts an analog audio signal obtained by a microphone into a digital audio signal, and transmits the obtained digital audio signal to the audio processing unit 121. The audio processing unit 121 performs processing such as processing for optimizing the level of the input digital audio signal, and outputs the resulting audio signal. The control unit 101 transmits the audio signal subjected to processing by the audio processing unit 121 to the memory 104.

The image processing unit 111 and the audio processing unit 121 read out the image signal and the audio signal that are temporarily stored in the memory 104, and generate a compressed image signal and a compressed audio signal or the like by performing predetermined encoding. The control unit 101 then composites the compressed image signal and the compressed audio signal, forms a data stream, and outputs the data stream to the recording/reproducing unit 140. Based on file system management such as UDF or FAT, the recording/reproducing unit 140 writes the data stream to the recording medium 141 as a one moving image file. Also, if the audio is not to be compressed, the control unit 101 outputs the audio signal generated by the audio processing unit 121 to the recording/reproducing unit 140 along with the compressed image signal generated by the image processing unit 111. As described above, based on file system management such as UDF or FAT, the recording/reproducing unit 140 writes the data stream to the recording medium 141 as a one moving image file. The above described operations continue while capturing is performed.

Also, during capturing, the control unit 101 transmits various types of control signals to the image capture unit 110, the image processing unit 111, the audio processing unit 121, and the like in accordance with user operations performed on the operation unit 102 and the results of analysis of the image signal generated by the image processing unit 111. For example, a control signal for causing lens movement, diaphragm adjustment, and the like to be performed is transmitted to the image capture unit 110, and a control signal for performing image and audio adjustment is transmitted to the image processing unit 111 and the audio processing unit 121.

Similarly, if the user performs an operation on the zoom key of the operation unit 102 during capturing, the control unit 101 can cause the image capture unit 110 to perform the "optical zoom" function and cause the image processing unit 111 to perform the "electronic zoom" function. The control unit 101 also causes the image capture unit 110 to perform the "optical antivibration" function and the image processing unit 111 to perform the "electronic antivibration" function based on an acceleration signal detected by the vibration detection unit (not shown).

If a capture end instruction signal is transmitted to the control unit 101 due to the user operating the moving image recording stop button of the operation unit 110, the control unit 101 transmits a capture end control signal to blocks of the image capture apparatus 100, and performs control such that operations such as the following are performed.

The image processing unit 111 and the audio processing unit 121 stop transmitting image signals and audio signals to the memory 104. The remaining image signals and audio signals stored in the memory 104 are then read out and subjected to predetermined encoding so as to generate a compressed image signal and a compressed audio signal or the like.

The control unit 101 then composites the last compressed image signal and compressed audio signal, forms a data stream, and outputs the data stream to the recording/reproducing unit 140. If the audio is not to be compressed, the control unit 101 outputs the audio signal generated by the audio processing unit 121 to the recording/reproducing unit 140 along with the compressed image signal.

Based on file system management such as UDF or FAT, the recording/reproducing unit 140 writes the data stream to the recording medium 141 as a one moving image file. When the supply of the data stream stops, the control unit 101 performs control such that operations such as the following are performed so as to generate thumbnails.

The recording/reproducing unit 140 reads out the compressed image signal corresponding to the head frame of a moving image file recorded on the recording medium 141, and transmits it to the image processing unit 111. The image processing unit 111 temporarily stores the compressed image signal in the memory 104 and decodes it according to a predetermined procedure. Next, the image processing unit 111 performs predetermined thumbnail encoding on the obtained image signal so as to generate a thumbnail compressed image signal. The control unit 101 then outputs the thumbnail compressed image signal to the recording/reproducing unit 140. Based on file system management such as UDF or FAT, the recording/reproducing unit 140 writes the thumbnail compressed image to the recording medium 141 along with the aforementioned attribute information so as to be joined with the moving image file on which the thumbnail compressed image is based, and stops the recording operation upon completing the moving image file.

When the recording operation stops, the control unit 101 transmits a control signal for causing a transition to the capture standby state to blocks of the image capture apparatus 100, and returns to the capture standby state.

Next, the reproduction mode will be described. If the reproduction mode is set by the operation unit 102, the control unit 101 transmits a control signal for causing a transition to a reproduction state to blocks of the image capture apparatus 100, and causes operations such as the following to be performed.

The recording/reproducing unit 140 determines a reproduction order of still image files constituted by compressed image signals recorded on the recording medium 141 or moving image files constituted by compressed image signals and compressed audio signals or audio signals, using information managed by the file system (e.g., filenames and updated date/time) or the aforementioned attribute information recorded in association with the files, and then performs readout. The control unit 101 also creates a list based on the reproduction order, and manages the list in a database provided in the memory 104. There are also cases where the database is recorded to the recording medium 141 for permanence, and is reused.

The control unit 101 sends the compressed image signals and compressed audio signals that were read out to the image processing unit 111 and the audio processing unit 121. If the audio signal is not compressed, the control unit 101 transmits the audio signal to the audio output unit 151.

The image processing unit 111 and the audio processing unit 121 temporarily store the compressed image signal and the compressed audio in the memory 104 and decode them according to a predetermined procedure. The control unit 101 then transmits the decoded audio signal to the audio output unit 151, and transmits the decoded image signal to the video output unit 150 and the display control unit 131. The display control unit 131 displays video corresponding to the input image signal on the display unit 130, and the audio output unit 151 outputs audio pertaining to the input audio signal using a built-in speaker or connected headphones or speakers.

The image capture apparatus of the present embodiment records and reproduces still images and moving images as described above.

Figure 4A:
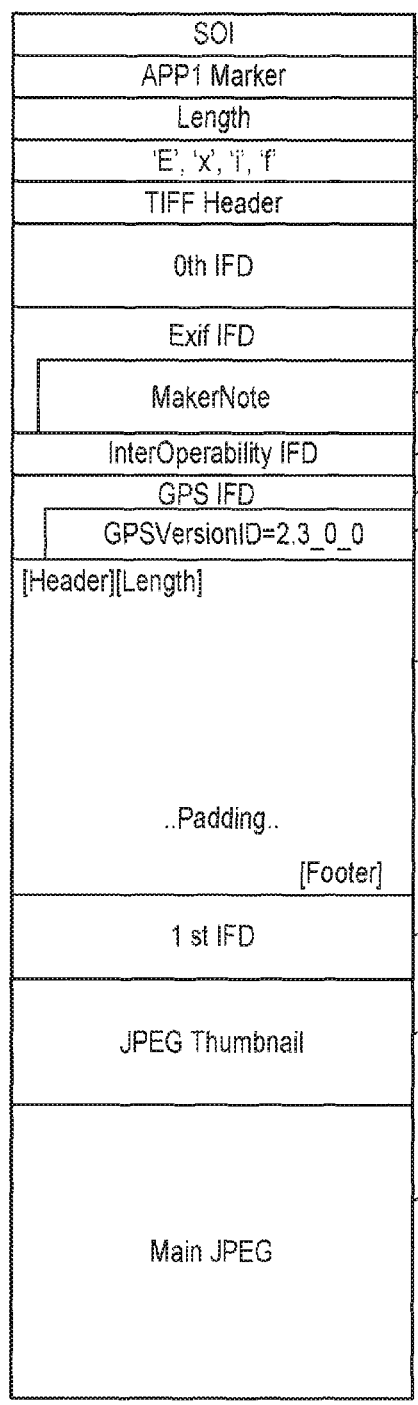
FIGS. 4A and 4B are diagrams showing structures of image files generated and reproduced by the digital camera according to the embodiment.
Figure 4B:
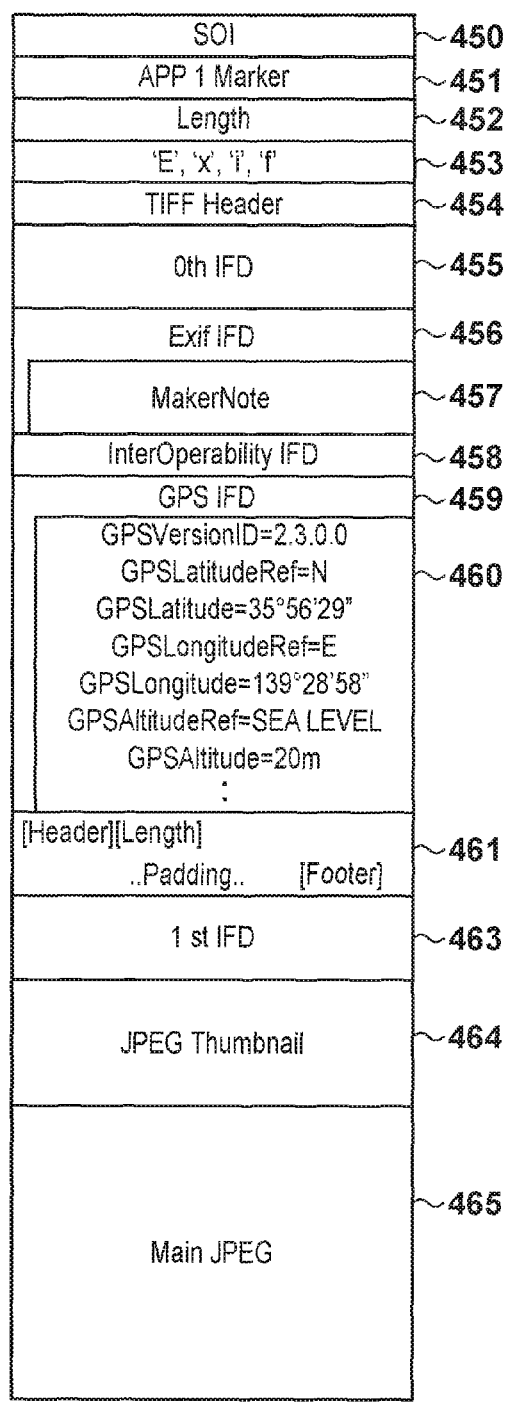

The following describes operations performed in the capture mode with reference to FIGS. 2, 4A, and 4B. FIG. 2 is a flowchart of operations performed at the time of image capture in the capture mode. FIGS. 4A and 4B are diagrams showing examples of image file format structures according to the present embodiment.

If a capture instruction is given by the user, capture processing is performed in step S201, and it is determined in step S202 whether location information has been measured. This is a determination regarding whether or not the aforementioned GPS signal reception module included in the communication unit 152 has measured the current location of the camera, or a determination of whether the acquisition of location information was successful or unsuccessful. Note that one easily understandable case where location information cannot be acquired is the case of performing image capture indoors where communication with the outside is blocked. If it is determined that location information was measured (or that the acquisition of location information was successful), that location information is added to the image in step S203, and the procedure moves to step S204.

Upon moving to step S204, a reserved area is allocated in a continuous area that follows the location information. Next, in step S205, other attributes are added, the data is stored as image data in a predetermined format (thumbnail JPEG image data), and the present processing ends.

The following describes file structures with reference to FIGS. 4A and 4B. FIG. 4A shows a file structure in the case where it was determined in step S202 that location information was not measured, and FIG. 4B shows a file structure in the case where location information was measured. In the file structures shown in FIGS. 4A and 4B, reference signs 410 and 450 denote identifiers SOI (Start Of Image) that indicate the start of the image, and reference signs 411 and 451 denote identifiers that indicate APP1, which is an application marker for storing later-described Exif information. Reference signs 412 and 452 denote a length indicating the length of the APP1, reference signs 413 and 453 denote a character string indicating that APP1 is Exif information, and reference signs 414 and 454 denote a TIFF header indicating that the subsequent information has a TIFF structure. Reference signs 415 and 455 denote a 0th IFD (first area), which is the first attribute information area and includes indication information pointing to a later-described Exif IFD, GPS IFD, and 1st IFD. Reference signs 416 and 456 denote an Exif IFD area, which holds camera-specific information and includes indication information pointing to a below-described MakerNote. Reference signs 417 and 457 denote a MakerNote area, in which information unique to the manufacturer of the image capture device is described. Reference signs 418 and 458 denote an IFD that indicates compatibility information. Reference signs 419 and 459 denote a GPS IFD area (second area) that indicates location information, and tag information 420 and 460 included therein can arbitrarily include GPS IFD version information, a latitude, a longitude, an altitude, a geodetic system, GPS time information, and the like. Note that since FIG. 4A shows the case where measurement is unsuccessful, location information cannot be stored, and therefore GPS version information is stored as predetermined information other than location information, as shown in the figure. Reference signs 421 and 461 denote a reserved area, which is used for describing an extension of the GPS IFD. This reserved area also includes header, footer, and length information, thus making it possible to check whether the reserved area is damaged. Reference signs 423 and 463 denote a 1st IFD area, in which indication information related to a thumbnail image in Exif, for example, is described. Reference signs 424 and 464 denote a thumbnail image area, and reference signs 425 and 465 denote the main image area of the file. The reserved areas 421 and 422 of the image files recorded as described above are used for the addition and deletion of attribute information in accordance with the following procedure.

Figure 3A:
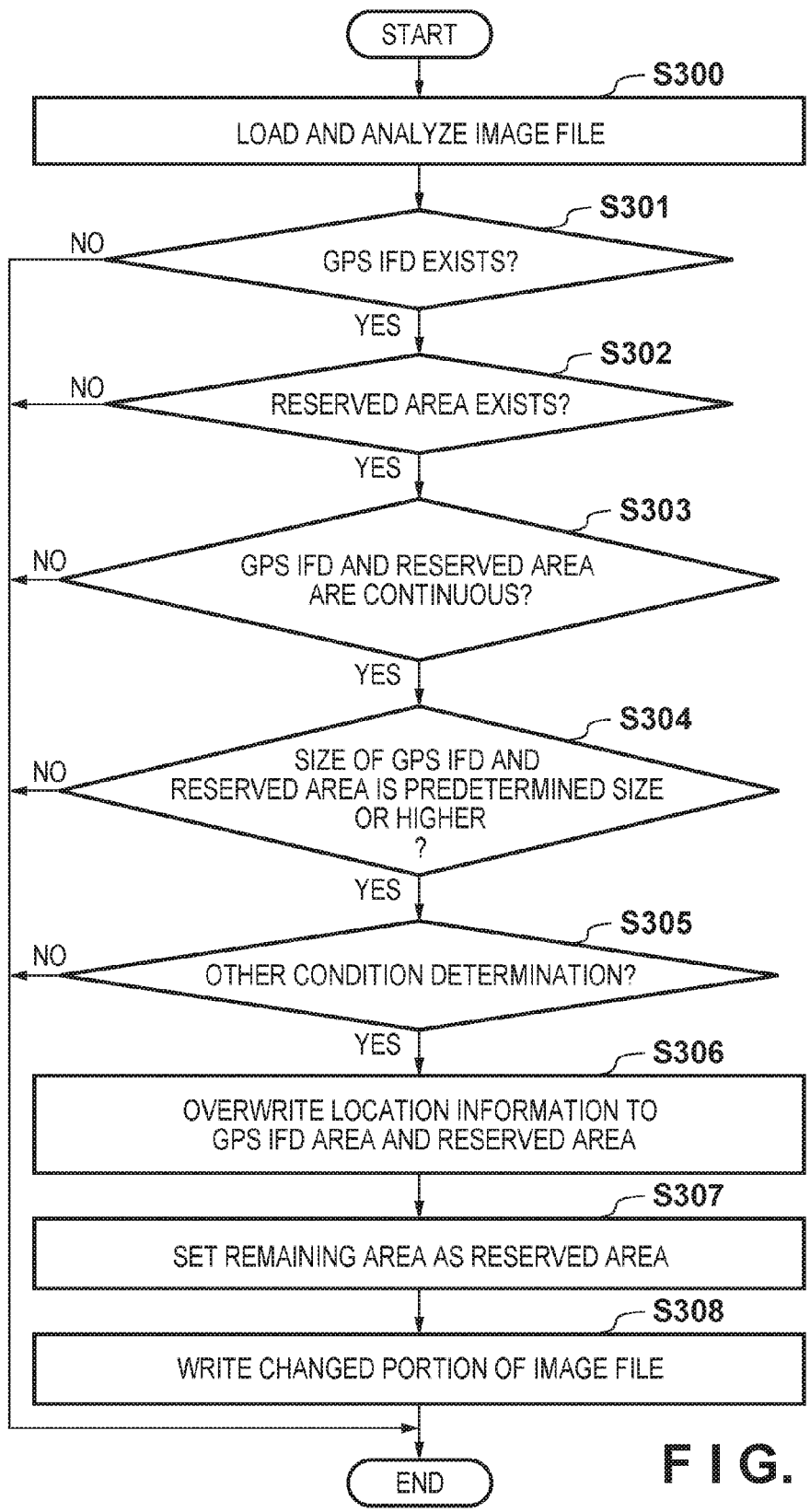
FIGS. 3A to 3C are flowcharts showing an addition mode of the digital camera according to the embodiment.
Figure 3B:
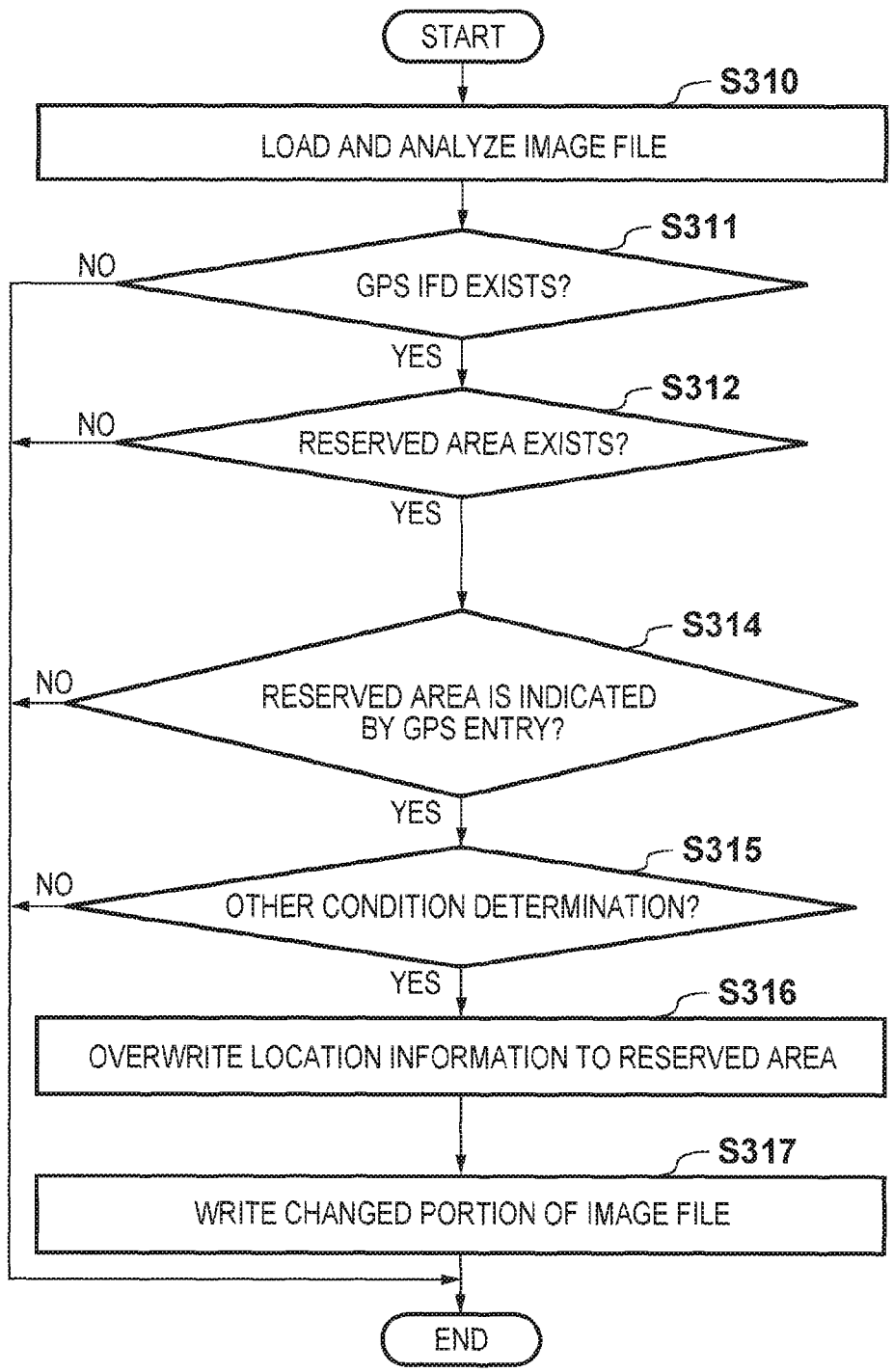
Figure 3C:
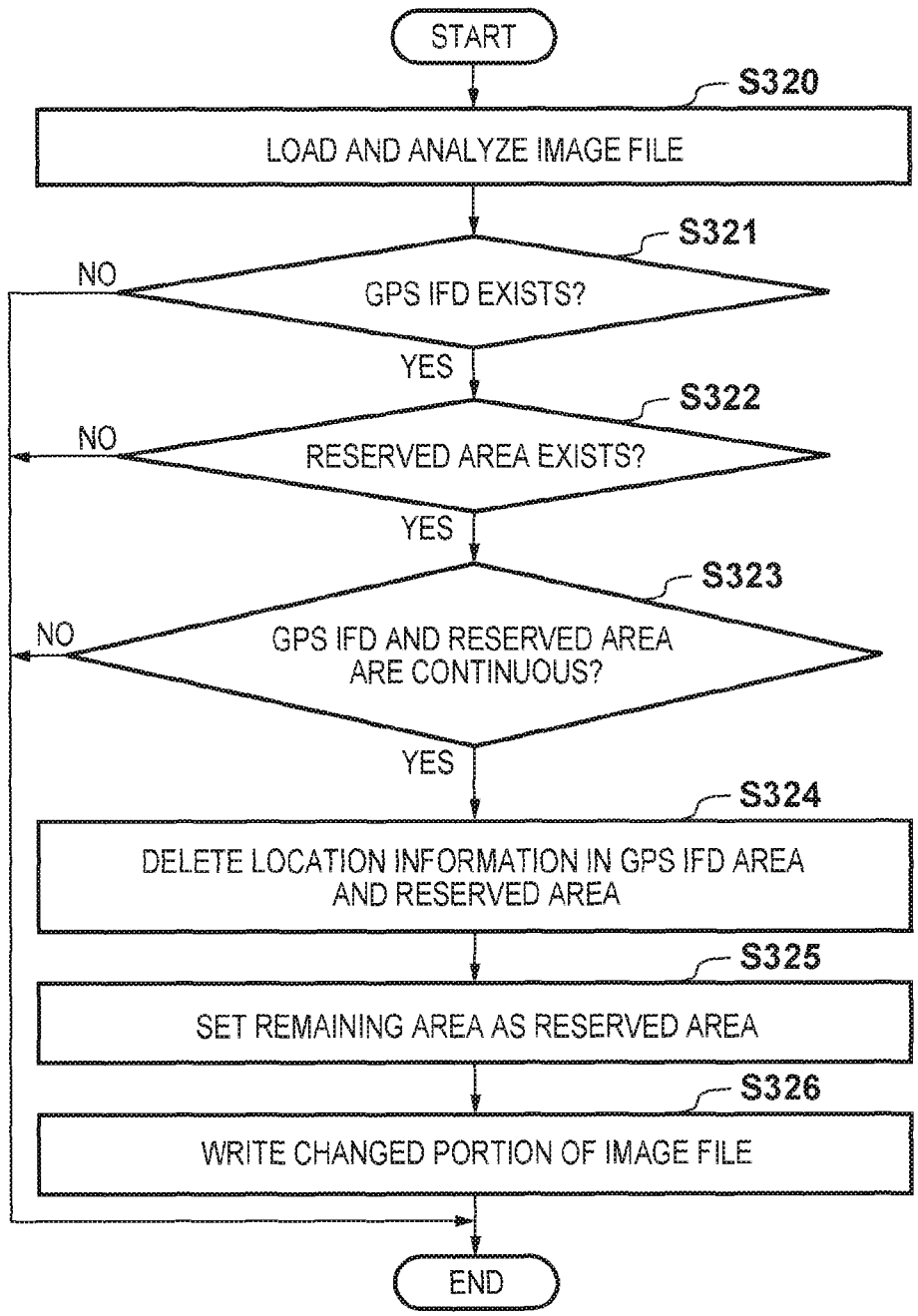

The following describes operations performed in the location information addition mode with reference to FIGS. 3A to 3C, 4A, and 4B. Note that the addition of location information is performed by the setting of location information for an image with input performed by the user via the operation unit 102, or the association of location information data received via the communication unit 152 with an image file with use of a world standard time. FIG. 3A shows the flow of the addition of location information to a rewritable recording medium, FIG. 3B shows the flow of the addition of location information to a recording medium that can be rewritten a limited number of times, and FIG. 3C shows the flow of the deletion of location information.

When an instruction to add location information to an image recorded on a rewritable recording medium is given, in step S300, the target image file is loaded from the recording medium 141 to the memory 104 and analyzed, and then in step S301, the existence of a GPS IFD is checked. If it is determined that a GPS IFD does not exist, this processing is escaped. This is because if a GPS IFD does not exist, GPS IFD indication information needs to be inserted into the 0th IFD as described above, thus leading to an increase in the size of the image file and requiring the entire file to be rewritten, and furthermore, since the file offset of data subsequent to the insertion position increases by an amount corresponding to the inserted amount, indication information of other data that is managed by attribute information (i.e., the file offset) also needs to be corrected.

If it is determined that a GPS IFD exists as a result of the analysis of the image file that was loaded in step S301, the procedure moves to step S302, in which it is determined whether a reserved area exists. If a reserved area does not exist, this processing is escaped, and if a reserved area exists, the procedure moves to step S303. In step S303, it is checked whether the GPS IFD is continuous with the reserved area, whereafter this processing is escaped if it is not continuous, and the procedure moves to step S304 if it is determined that it is continuous. In step S304, it is determined whether the size of the GPS IFD and the reserved area is greater than or equal to a predetermined size, whereafter this processing is escaped if it is less than the predetermined size, and the procedure moves to step S305 if it is greater than or equal to the predetermined size.

The following describes the determinations of steps S301 to S304 with reference to FIG. 4A. The determination of step S301 is a check regarding the presence/absence of reference sign 419, that is to say, whether or not indication information exists in the 0th IFD, and the determination of step S302 is a check regarding the reserved area 421, that is to say, a check regarding the header, footer, and length. The determination of step S303 is a determination regarding whether the area 419 including 420 has been allocated in a continuous area, that is to say, whether or not a data area indicating tags in 420, 419 exists in the areas 419, 420, and whether or not a reserved area starts from the address subsequent to the last address of 420, 419. The determination of step S304 is a determination regarding whether the size of the continuous areas 419, 420, and 421 is greater than or equal to a predetermined size.

Next, in step S305, a determination regarding another condition is performed. This is a determination regarding, for example, whether or not a world standard time at which the image was captured, time difference information that enables the calculation of a world standard time, or the like is described. In other words, this is because if location information is to be associated with the image file using a world standard time as described above, the location information cannot be calculated if such time information is not described.

If an affirmative determination is made in the determination of another condition in step S305, the procedure moves to step S306, and GPS IFD tag information such as a latitude, a longitude, and an altitude are described using the areas 419, 420, and 421 shown in FIG. 4A. At this time, the predetermined size used in the determination of step S304 is thought to be a sufficient size obtained in advance by estimating the total size of the described tags, but if the size is not sufficient, tags in the GPS IFD tag information may be described in accordance with a priority order that has been determined. For example, it is possible to describe the latitude and longitude, which are thought to have priority as location information, with priority, then describe the altitude if space is available, and then describe the GPS time if space is available.

Next, in step S307, if the size of the location information described using the areas 419, 420, and 421 shown in FIG. 4A is lower than the total size of the areas 419, 420, and 421, the remaining area is again set as a reserved area.

FIG. 4B shows the configuration of the file that underwent the processing of steps S306 and S307 described above. As shown by the area 460, various types of GPS-related information are described in an area in the area 420, and as shown by the area 461, the reserved area 421 decreases in size by a commensurate amount. Next, in step S308, the image file that was edited in the memory 104 in steps S306 and S307 is overwritten to the recording medium 141. At this time, since only the GPS IFD area and the reserved area of the image file have been changed, it is sufficient to rewrite only the changed areas, while leaving the enormous amount of image data on the recording medium 141 as it is, thus making it possible to increase the speed of processing.

The following describes processing in the case where an instruction is given for adding location information to an image recorded on a recording medium that can be rewritten a limited number of times, with reference to the flowchart of FIG. 3B.

In this case, in step S310, the target image file is loaded from the recording medium 141 to the memory 104 and analyzed. Then, in step S311, the presence/absence of a GPS IFD is checked. If it is determined that a GPS IFD does not exist, this processing is escaped. This is because if a GPS IFD does not exist, GPS IFD indication information needs to be inserted into the 0th IFD as described above, but this cannot be realized with a recording medium that can be rewritten a limited number of times. Next, if it is determined that a GPS IFD exists as a result of the analysis of the image file that was loaded in step S311, the procedure moves to step S312, in which it is determined whether a reserved area exists, whereafter this processing is escaped if it does not exist, and the procedure moves to step S314 if it does exist. In step S314, it is determined whether an area indicated by the GPS IFD is encompassed in the reserved area. In other words, tags such as a latitude and a longitude have been described in the GPS IFD in advance, and rewriting at a later time can be performed by setting the data area indicating the entity data of the tags as a reserved area.

The following describes the determinations of steps S311 to S314 with reference to FIG. 4A. The determination of step S311 is a check regarding the presence/absence of the area 419, that is to say, whether or not indication information is described in the 0th IFD. The determination of step S312 is a check regarding the area 421, that is to say, it is checked whether the value of the area is the initial value of a recording medium that can be rewritten a limited number of times. The determination of step S314 is a determination regarding whether a data area indicated by tag information described in the area 419 is included in an area in the area 421.

Next, in step S315, a determination regarding another condition is performed. This is a determination regarding, for example, whether or not a world standard time at which the image was captured, time difference information that enables the calculation of a world standard time, or the like is described. In other words, if location information is to be associated with the image file using a world standard time as described above, the location information cannot be calculated if such time information is not described.

If an affirmative determination is made in the determination regarding another condition in step S315, the procedure moves to step S316, and GPS IFD tag information such as a latitude, a longitude, and an altitude are described using area 421 shown in FIG. 4A.

FIG. 4B shows the configuration of the file that underwent the processing of step S316 described above. As shown by the area 460, various types of GPS-related information are described in the area 420, and as shown by the area 461, the reserved area 421 decreases in size by a commensurate amount. Next, in step S317, the image file that was edited in the memory 104 in step S316 is overwritten to the recording medium 141. At this time, since only the reserved area of the image file has been changed, it is sufficient to rewrite only the changed area, thus making it possible for attribute information to be added at a later time to a recording medium that can be rewritten a limited number of times.

The following describes processing in the case where an instruction is given for deleting location information from an image recorded on a rewritable recording medium with reference to the flowchart of FIG. 3C.

In this case, in step S320, the target image file is loaded from the recording medium 141 to the memory 104 and analyzed. Then, in step S321, the presence/absence of a GPS IFD is checked. If it is determined that a GPS IFD does not exist, this processing is escaped. Next, the procedure moves to step S322, in which it is determined whether a reserved area exists, whereafter this processing is escaped if it does not exist, and the procedure moves to step S323 if it does exist. In step S323, it is checked whether the GPS IFD is continuous with the reserved area, whereafter this processing is escaped if it is not continuous, and the procedure moves to step S324 if it is determined that it is continuous. Next, in step S324, the location information described using the areas 459, 460, and 461 shown in FIG. 4B is deleted. Version information is then written in its place. Then, in step S325, the remaining area that follows the version information is re-set to a reserved area. This results in the state shown by the areas 419, 420, and 421 in FIG. 4A. Next, in step S326, the image file that was edited in the memory 104 in steps S324 and S325 is overwritten to the recording medium 141. At this time, since only the GPS IFD area and the reserved area of the image file have been changed, it is sufficient to rewrite only the changed areas, while leaving the enormous amount of image data on the recording medium 141 as it is, thus making it possible to increase the speed of processing. Also, attribute information can be again added to the image file generated through this processing.

OTHER EMBODIMENTS

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-165140, filed Jul. 25, 2012, which is hereby incorporated by reference herein in its entirety.

What is claimed is:

1. An image processing apparatus that stores an image into a recording medium as an image file having a predetermined file format, comprising:
a storing unit that stores, into a recording medium, an image file in which a predetermined size of a reservation area is allocated within a recording area for attribute information complying with the predetermined image file format;
an acquisition unit that acquires location information; and
a control unit that, if predetermined time information has been stored as one attribute within the recording area in an image file stored in the recording medium, writes the location information acquired by the acquisition unit into the reservation area of the image file, and, if predetermined time information has not been stored as one attribute within the recording area in the image file, does not write the location information into the image file stored into the reservation area of the image file.

2. The apparatus according to claim 1, wherein the acquisition unit acquires the location information from an external device by communicating with the external device using a communication unit.

3. The apparatus according to claim 1, wherein the location information is associated with a world standard time.

4. The apparatus according to claim 1, wherein the predetermined time information is a world standard time or time information from which the world standard time is calculated.

5. The apparatus according to claim 1, wherein the storing unit stores, as the attribute information of the image file, information indicating the existence of location information in a first area and allocates the reservation area having the predetermined size in an area that follows the first area, and
wherein the control unit writes the location information acquired by the acquisition unit into the reservation area.

6. A method of controlling an image capture apparatus that stores an image captured by an image capture unit to a recording medium as an image file having a predetermined image file format, comprising:
storing, into a recording medium, an image file in which a predetermined size of a reservation area is allocated within a recording area for attribute information complying with the predetermined image file format;
acquiring location information;
if predetermined time information has been stored as one attribute within the recording area in an image file stored in the recording medium, writing the acquired location information into the reservation area of the image file; and
if predetermined time information has not been stored as one attribute within the recording area in the image file, not writing the location information into the image file stored into the reservation area of the image file.

7. The method according to claim 6, wherein the location information is acquired from an external device by communicating with the external device.

8. The method according to claim 6, wherein the location information is associated with a world standard time.

9. The method according to claim 6, wherein the predetermined time information is a world standard time or time information from which the world standard time is calculated.

10. The method according to claim 6, further comprising:
storing, as the attribute information of the image file, information indicating the existence of location information in a first area;
allocating the reservation area having the predetermined size in an area that follows the first area; and
writing the acquired location information into the reservation area.

11. A non-transitory computer-readable storage medium storing a program that, when loaded and executed by a computer, causes the computer to execute a method of controlling an image capture apparatus that stores an image captured by an image capture unit to a recording medium as an image file having a predetermined image file format, the method comprising:

storing, into a recording medium, an image file in which a predetermined size of a reservation area is allocated within a recording area for attribute information complying with the predetermined image file format;

acquiring location information;

if predetermined time information has been stored as one attribute within the recording area in an image file stored in the recording medium, writing the acquired location information into the reservation area of the image file; and if predetermined time information has not been stored as one attribute within the recording area in the image file, not writing the location information into the image file stored into the reservation area of the image file.

\* \* \* \* \*